United States Patent
Cabioch et al.

(10) Patent No.: US 6,506,862 B2
(45) Date of Patent: Jan. 14, 2003

(54) PROCESS FOR THE PREPARATION OF A DIENE ELASTOMER BY ANIONIC POLYMERIZATION

(75) Inventors: Jean-Luc Cabioch, Chateaugay (FR); Jean-Noël Gorce, Tuscalossa, AL (US)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 09/977,718

(22) Filed: Oct. 15, 2001

(65) Prior Publication Data

US 2002/0143128 A1 Oct. 3, 2002

(30) Foreign Application Priority Data

Oct. 17, 2000 (FR) .............................................. 0013418

(51) Int. Cl.[7] .......................... C08F 4/52; C08F 236/10
(52) U.S. Cl. ...................... 526/175; 526/177; 526/187; 526/335; 526/340; 525/272
(58) Field of Search ................ 526/175, 177, 526/187, 335, 340; 525/272

(56) References Cited

U.S. PATENT DOCUMENTS

| | | | | |
|---|---|---|---|---|
| 3,140,278 A | | 7/1964 | Kuntz | 260/94.2 |
| 3,631,006 A | * | 12/1971 | Hawkins | 526/187 X |
| 3,830,880 A | | 8/1974 | LaMare | 260/879 |
| 4,148,985 A | * | 4/1979 | DeZarauz | 526/187 X |
| 4,367,325 A | | 1/1983 | Takeuchi et al. | 526/340 |
| 4,933,401 A | * | 6/1990 | Hattori et al. | 526/175 |
| 5,063,190 A | | 11/1991 | Hargis et al. | 502/157 |
| 5,100,965 A | | 3/1992 | Hsu et al. | 525/249 |
| 5,134,199 A | | 7/1992 | Hattori et al. | 525/314 |
| 5,159,022 A | | 10/1992 | Ikematu et al. | 525/250 |
| 5,202,499 A | | 4/1993 | Hargis et al. | 568/587 |
| 5,216,181 A | | 6/1993 | Hargis et al. | 549/513 |
| 5,514,753 A | | 5/1996 | Ozawa et al. | 525/279 |
| 5,753,579 A | * | 5/1998 | Jalics et al. | 526/187 X |

FOREIGN PATENT DOCUMENTS

| WO | 9807765 | 2/1998 |
|---|---|---|

* cited by examiner

*Primary Examiner*—Fred Teskin
(74) *Attorney, Agent, or Firm*—Baker Botts LLP

(57) ABSTRACT

The present invention provides a process for the preparation of a diene elastomer having a reduced amount of vinyl linkages, by anionic polymerization of one or more monomers comprising at least one conjugated diene monomer. The process for preparing the diene elastomer having a reduced amount of vinyl linkages comprises anionically polymerizing one or more monomers comprising at least one conjugated diene monomer in a polymerization medium comprising a hydrocarbon solvent, a polar agent comprising one or more heteroatoms and a monolitiated or polylithiated organolithiated initiator, wherein an organometallic complex of the formula $LiAl(R)_3(R')$, in which Li is a lithium atom, Al is an aluminum atom, and R and R' are each an alkyl, cycloalkyl or aryl group, is added to the polymerization medium to produce the diene elastomer having a reduced amount of vinyl linkages.

15 Claims, No Drawings

PROCESS FOR THE PREPARATION OF A DIENE ELASTOMER BY ANIONIC POLYMERIZATION

BACKGROUND OF THE INVENTION

The present invention is directed to a process for preparing a diene elastomer having a reduced amount of vinyl linkages by anionic polymerization of one or more monomers comprising at least one conjugated diene monomer.

A conjugated diene monomer such as butadiene may be incorporated into an anionically produced polymer via cis-1,4, trans-1,4 or -1,2(vinyl) linkages.

Anionic polymerization reactions are conventionally initiated by an alkyllithium, in the presence of a hydrocarbon solvent and one or more conjugated diene monomers. Elastomers produced by these reactions have an average amount of vinyl linkages which is generally between 8% and 15%. In order to obtain elastomers having a given glass transition temperature (Tg), a polar agent is added to the polymerization medium, which has the effect of significantly increasing the average amount of vinyl linkages in the polymer. This amount may reach 90%, for example.

Attempts have been made to reduce the increased amount of vinyl linkages in the polymer during polymerization, when polymerization is performed in the presence of a polar agent, by acting on the polymerization medium.

One known method involves increasing the polymerization temperature and using a polar agent formed of a Lewis base, optionally in the presence of a Lewis acid. The amount of vinyl linkages in the copolymer obtained using this method can be reduced to about 20% to 50%. Reference may be made to U.S. Pat. No. 3,830,880 and JP-A-56/149413 for detailed descriptions of such a method. However, a major disadvantage of this method lies in the chain transfers which the implementation thereof generally causes.

Another known method for reducing the amount of vinyl linkages involves eliminating the polar agent from the polymerization medium under reduced pressure, then adding an additional quantity of monomer to the polymerization medium thus obtained. Reference may be made to U.S. Pat. No. 3,140,278 for the description of this method. However, this method is only applicable to copolymerization operations carried out in the presence of a volatile polar agent. Moreover, the reduction in the amount of vinyl linkages in the resulting polymers is not significant. This method is also difficult to implement on an industrial scale.

SUMMARY OF THE INVENTION

The object of the present invention is to provide an anionic polymerization process for the preparation of a diene elastomer which overcomes the aforementioned disadvantages.

It has been discovered that the addition, to a polymerization medium comprising:

a hydrocarbon solvent, one or more conjugated diene monomers, a polar agent comprising one or more heteroatoms, and a monolithiated or polylithiated organolithiated initiator, of an organometallic complex of the formula $LiAl(R)_3(R')$ (in which Li is a lithium atom, Al an aluminum atom, and R and R' are each an alkyl, cycloalkyl or aryl group), makes it possible to oppose the effect of the polar agent by significantly reducing the average amount of vinyl linkages in the elastomer obtained, independent of the nature of the polar agent and the initiator which are used.

The addition of the organometallic complex to the polymerization medium has no significant effect on the molecular weights, or the distributions, of the elastomers produced.

Moreover, the addition of an additional quantity of polar agent subsequent to the introduction of the organometallic complex into the reaction medium has the effect of again increasing the average amount of vinyl linkages in the diene elastomer. This provides the ability during polymerization to adjust the amount of vinyl linkages in the polymer product to a desired average amount.

DETAILED DESCRIPTION OF THE INVENTION

The present invention provides a process for preparing a diene elastomer having a reduced amount of vinyl linkages. The process involves anionically polymerizing one or more monomers comprising at least one conjugated diene monomer in a polymerization medium comprising a hydrocarbon solvent, a polar agent having one or more heteroatoms and a monolithiated or polylithiated organolithiated initiator, wherein an organometallic complex of the formula $LiAl(R)_3(R')$, in which Li is a lithium atom, Al is an aluminum atom, and R and R' are each an alkyl, cycloalkyl or aryl group, is added to the polymerization medium to produce the diene elastomer having a reduced amount of vinyl linkages.

Hydrocarbon solvents usable in the process according to the invention include, inter alia, toluene, benzene, xylene, cyclohexane, methylcyclohexane, heptane, n-hexane, cyclopentane, or mixtures of these solvents.

In accordance with the present invention, suitable conjugated diene monomers for use in the process include 1,3-butadiene, 2-methyl-1,3-butadiene, 2,3-di(C1 to C5 alkyl)-1,3-butadienes, for example, 2,3-dimethyl-1,3-butadiene, 2,3-diethyl-1,3-butadiene, 2-methyl-3-ethyl-1,3-butadiene and 2-methyl-3-isopropyl-1,3-butadiene, an aryl-1,3-butadiene, 1,3-pentadiene and 2,4-hexadiene.

Suitable vinyl-aromatic compounds include styrene, ortho-, meta- and para-methylstyrene, the commercial mixture "vinyltoluene", para-tert.-butylstyrene and divinylbenzene. Styrene is preferred.

The diene elastomer prepared by the process of the invention may be any homopolymer or copolymer having diene blocks which is obtained by polymerization:

of a conjugated diene monomer having from 4 to 12 carbon atoms or of several of these conjugated diene monomers together, or alternatively of one or more of these conjugated diene monomers with one or more vinyl-aromatic compounds, each having from 8 to 20 carbon atoms.

Particularly preferably, butadiene and/or isoprene is/are used as conjugated diene monomers and styrene as vinyl-aromatic monomer in the process according to the invention to produce copolymers having diene blocks, each block resulting from the monomers and comprising, for example, units:

of styrene and butadiene, of styrene and isoprene, of butadiene and isoprene or, alternatively of butadiene, styrene and isoprene.

Advantageously, the diene blocks of the elastomer which is obtained by the process according to the invention have amounts of vinyl linkages which significantly differ from each other.

The anionic polymerization process of the invention allows for production of a diene elastomer comprising a plurality of alternating diene blocks that which have amounts of vinyl linkages that are very different from each other (for example, an elastomer of type A—B—A—B, in which A and B are two diene blocks containing high and reduced amounts of vinyl linkages, respectively), by alternately adding the polar agent and the organometallic complex to the polymerization medium at given conversion rates.

Additionally, the use of the organometallic complex according to the invention makes it possible to prepare elastomers having a reduced average amount of vinyl linkages, following the preparation of elastomers having a high average amount of vinyl linkages, without having to extract the polar agent providing this high amount from the solvent. This is because of the "anti-polar" effect for said amount of the organometallic complex according to the invention.

In a further aspect of the invention, the organometallic complex may be added at any stage of polymerization, including prior to introduction of the initiator to the reaction medium.

The organometallic complex may be prepared by reacting an alkyllithium with a trialkylaluminium derivative in a hydrocarbon solvent at ambient temperature.

In a preferred embodiment, the organometallic complex has the formula $LiAl(R)_3(Bu)$, in which Bu designates a butyl group.

In an example of this preferred embodiment, the organometallic complex has the formula $LiAl(Oct)_3(Bu)$, in which Oct designates an octyl group. This complex comprising an octyl group has particularly high solubility in aliphatic or alicyclic hydrocarbon solvents, such as cyclohexane.

In another example of this preferred embodiment, the organometallic complex has the formula $LiAl(Et)_3(Bu)$, in which Et designates an ethyl group.

In accordance with the invention, the molar ratio of organometallic complex/polar agent varies from 0.1 to 10. The molar ratio of polar agent/initiator also varies from 0.1 to 10.

Polar agents that may be used in the process according to the invention include polar agents comprising a single heteroatom (oxygen or nitrogen atom), also referred to as "monodentate", as well as polar agents comprising several heteroatoms, also referred to as "multidentate".

A "monodentate" polar agent for use in the process according to the invention is tetrahydrofuran (THF).

"Multidentate" polar agents for use in the process include diethers and diamines, such as tetramethylethylenediamine, dimethoxyethane (DME), diethylcarbitol (DEC), triethyleneglycoldimethylether (also called "triglyme"), tetraethyleneglycoldimethylether (also called "tetraglyme"), and tetramethylethylenediamine (TMEDA).

"Multidentate" polar agents are preferred according to the invention because they make it possible to obtain high average amounts of vinyl linkages, even when their concentration is reduced compared to that of the initiator.

Moreover, when a "multidentate" polar agent is used, the organometallic complex according to the invention permits a significant reduction in the average amount of vinyl linkages in the elastomer, even when it is used in a quantity which is not very high relative to that of the polar agent (for example, by adding 1 molar equivalent of the complex to 1 equivalent of "multidentate" polar agent).

In regard to a styrene-butadiene copolymerization carried out in the presence of a "multidentate" polar agent, the addition of an appropriate quantity of the organometallic complex to the polymerization medium provides amounts of styrene and vinyl linkages in the resulting elastomer which are comparable to those which would have been obtained in the absence of polar agent.

Organolithiated initiators that may be used in the process of the invention include monolithiated compounds, such as n-butyllithium, sec-butyllithium, tert-butyllithium, n-propyllithium, amyllithium, cyclohexyllithium or phenylethyllithium. Polylithiated or functional initiators may also be used.

According to another aspect of the invention, polymerization is carried out at a temperature of between 0° C. and 100° C., preferably, between 30° C. and 80° C.

According to the invention, the polymerization process may be carried out continuously or discontinuously. For continuous polymerization, a system preferably comprising several reactors is used, wherein the organometallic complex is injected between two reactors. During discontinuous polymerization, the organometallic complex may be injected into the polymerization medium at any stage of the conversion of the monomer(s).

The present invention will be better understood on reading the following description of examples of the invention, which are given by way of illustration and not of limitation.

For the examples, the SEC technique (size exclusion chromatography) was used to determine the molecular weights and the polymolecularity indices of the elastomers obtained. According to this technique, macromolecules are separated physically according to their respective sizes when swollen, in columns filled with a porous stationary phase.

A model "150C" chromatograph sold by "WATERS" was used for the separation. A set of two "STYRAGEL HT6E" "WATERS" columns was used.

Furthermore, the technique of carbon-13 nuclear magnetic resonance ($^{13}$C-NMR) was used to determine microstructure characteristics relative to the elastomers obtained. To this end, a spectrophotometer sold by "BRUKER" was used at a frequency of 200 MHz.

EXAMPLE 1

Preparation of Homopolymers Having Two Polybutadiene Blocks (BR-BR)

1) Synthesis of an Organometallic Complex of Formula $LiAl (Et)_3(Bu)$ 0.1 moles of butyllithium are added to a stoppered, deaerated flask containing 100 ml of a solution of 0.1 moles per liter of (active) triethylaluminium in toluene. The flask is stirred for 15 minutes at ambient temperature. The solution may be kept for several weeks at ambient temperature, under nitrogen pressure.

2) Preparation of BR-BR Having Various Average Amounts of Vinyl Linkages

The polymerization steps are carried out under an inert atmosphere in a stoppered flask.

a) "Control" BR-BR Elastomer Having a High Average Amount of Vinyl Linkages 10 g of butadiene and $5\times10^{-5}$ moles of tetramethylethylenediamine (TMEDA) are introduced into a flask containing 81 ml of deaerated toluene. The impurities are neutralized using n-BuLi. Then, $5\times10^{-5}$ moles of n-BuLi are added.

The polymerization reaction is carried out at 50° C. and at 100% conversion of the butadiene, this rate being achieved after 55 minutes.

1 ml of methanol is added to the "control" polybutadiene obtained, which is then antioxidized by addition of 0.3 g of 4,4-methylene bis-2,6-tert. butylphenol and dried at reduced pressure (200 mm Hg) at 50° C. for 24 hours.

b) BR-BR Elastomer According to the Invention Having a Reduced Average Amount of Vinyl Linkages 10 g of butadiene and $5\times10^{-5}$ moles of tetramethylethylenediamine (TMEDA) are introduced into a flask containing 81 ml of deaerated toluene. The impurities are neutralized using n-BuLi. Then, $5\times10^{-5}$ moles of n-BuLi are added.

The polymerization reaction is carried out at 50° C. and, after 23% conversion of the butadiene, $6\times10^{-5}$ moles of $LiAl(Et)_3(Bu)$ are added. The reaction is continued until there is 100% conversion of the butadiene, this rate being achieved after 75 minutes.

1 ml of methanol is added to the polybutadiene obtained according to the invention, which is then antioxidized by addition of 0.3 g of 4,4-methylene bis-2,6-tert. butylphenol and dried at reduced pressure (200 mm Hg) at 50° C. for 24 hours.

c) Characteristics of the BR-BR Elastomers thus Obtained

The microstructures are determined by the aforementioned $^{13}$C-NMR technique at 200 MHz. The "control" BR-BR elastomer has an average amount of vinyl linkages of 74%, as do each of the two BR blocks which it comprises.

In distinction, the BR-BR elastomer according to the invention has an average amount of vinyl linkages of only 28%, resulting from the addition of $LiAl(Et)_3(Bu)$ during polymerization. Furthermore, the two blocks of the elastomer have distinctly different amounts of vinyl linkages. The first BR block has the microstructure of the "control" elastomer, whereas the second BR block has an amount of vinyl linkages of 14%.

The polymolecularity index (Ip), determined by the size exclusion chromatography technique, is 1.09 for both the control BR-BR and the BR-BR according to the invention.

The molecular weights of the "control" BR-BR and the BR-BR according to the invention are 140000 g/mole and 130000 g/mole, respectively.

3) Preparation of Other BR-BRs Having Various Average Amounts of Vinyl Linkages a) The Polymerization Operations A "control" BR-BR elastomer and a BR-BR elastomer according to the invention are prepared using same conditions as those described in section 2 of this Example 1 (using the same organometallic complex), except that:

dimethoxyethane (DME) is used instead of tetramethylethylenediamine (TMEDA) as polar agent, the quantities used remaining the same as above, and that the $LiAl(Et)_3(Bu)$ complex is added to the polymerization medium when the conversion rate of the butadiene reaches 18%.

b) Characteristics of the "Control" BR-BR Elastomer and the BR-BR Elastomer According to the Invention which are Obtained The microstructures are determined as previously.

The "control" BR-BR elastomer has an average amount of vinyl linkages of 60%, as do each of the two BR blocks which it comprises.

On the other hand, the BR-BR elastomer according to the invention has an average amount of vinyl linkages of only 25%, resulting from the addition of $LiAl(Et)_3(Bu)$ during polymerization. Furthermore, the two BR-BR blocks of the elastomer have distinctly different amounts of vinyl linkages. The first BR block has the microstructure of the "control" elastomer, whereas the second BR block has an amount of vinyl linkages of 17%. The polymolecularity index (Ip), determined by the SEC technique, is still 1.09 for both the "control" BR and the BR according to the invention.

The molecular weights of the "control" BR-BR and the BR-BR according to the invention are 140000 g/mole and 130000 g/mole, respectively.

EXAMPLE 2

Preparation of Copolymers Having Two Styrene/butadiene Blocks (SBR-SBR)

1) Preparation of SBR-SBR Having Various Average Amounts of Vinyl Linkages

The "control" and invention copolymers are prepared using the same conditions as those described in section 2 of Example 1(using the same organometallic complex), except that:

the 10 g of butadiene is replaced by 4 g of styrene and 6 g of butadiene, and that the $LiAl(Et)_3(Bu)$ complex is added to the polymerization medium when the conversion rate of the butadiene reaches 30%.

2) Characteristics of the "Control" SBR-SBR and the SBR-SBR According to the Invention which are Obtained Samples of each of the "control" SBR-SBR and SBR-SBR according to the invention were taken at different conversion rates of the monomers. Each sampling was stopped with methanol, antioxidized, and dried at reduced pressure. The different samples were analyzed by near-infrared spectroscopy in order to obtain the amount of styrene and vinyl linkages. The characteristics of microstructure are summarized in Table I below.

TABLE I

| | "Control" SBR-SBR | | SBR-SBR according to the invention | |
|---|---|---|---|---|
| Conversion rate | styrene linkages (average amount) | vinyl linkages (average amount) | styrene linkages (average amount) | vinyl linkages (average amount) |
| 30% | 22% | 54% | 22% | 54% |
| 50% | 25% | 56% | 17% | 40% |
| 60% | 28% | 53% | 18% | 38% |

This example shows that the addition to the polymerization medium of the $LiAl(Et)_3(Bu)$ complex makes it possible to reduce significantly the average amount of vinyl linkages in the elastomer having two SBR-SBR blocks.

What is claimed is:

1. A process for preparing a diene elastomer having a reduced amount of vinyl linkages comprising:
   anionically polymerizing one or more monomers comprising at least one conjugated diene monomer in a polymerization medium comprising a hydrocarbon solvent, a polar agent comprising one or more heteroatoms and a monolithiated or polylithiated organolithiated initiator, wherein an organometallic complex of the formula $LiAl(R)_3(R')$, in which Li is a lithium atom, Al is an aluminum atom, and R and R' are each an alkyl, cycloalkyl or aryl group, is added to the polymerization medium to produce the diene elastomer having a reduced amount of vinyl linkages.

2. The process for preparing a diene elastomer according to claim 1, wherein the organometallic complex has the formula $LiAl(R)_3(Bu)$, in which Bu designates a butyl group.

3. The process for preparing a diene elastomer according to claim 2, wherein the organometallic complex has the formula $LiAl(Oct)_3(Bu)$, in which Oct designates a octyl group.

4. The process for preparing a diene elastomer according to claim 2, wherein the organometallic complex has the formula $LiAl(Et)_3(Bu)$, in which Et designates a ethyl group.

5. The process for preparing a diene elastomer according to claim 1, wherein the molar ratio of organometallic complex/polar agent is from 0.1 to 10.

6. The process for preparing a diene elastomer according to claim 1, wherein the molar ratio of polar agent/initiator is from 0.1 to 10.

7. The process for preparing a diene elastomer according to claim 1, wherein the polar agent comprises several heteroatoms.

8. The process for preparing a diene elastomer according to claim 7, wherein the polar agent is selected from the group consisting of diethers and diamines.

9. The process for preparing a diene elastomer according to claim 8, wherein the polar agent is tetramethylethylenediamine.

10. The process for preparing a diene elastomer according to claim 8, wherein the polar agent is dimethoxyethane.

11. The process for preparing a diene elastomer according to claim 1, comprising homopolymerizing a conjugated diene monomer or copolymerizing several conjugated diene monomers together, wherein the process forms a plurality of diene blocks, each of which results from said monomer(s) and has different amounts of vinyl linkages.

12. The process for preparing a diene elastomer according to claim 1, comprising copolymerizing one or more conjugated diene monomers with one or more vinyl-aromatic monomers, wherein a plurality of diene blocks is formed, each of which results from said monomers and has different amounts of vinyl linkages.

13. A process for preparing a block polybutadiene homopolymer elastomer having a reduced amount of vinyl linkages comprising:

anionically polymerizing butadiene monomers in a polymerization medium comprising toluene, tetramethylethylene diamine and n-butyl lithium, wherein $LiAl(Et)_3Bu$, in which Li is a lithium atom, Al is an aluminum atom, Et is ethyl and Bu is butyl, is added to the polymerization medium to produce the butadiene elastomer having a reduced amount of vinyl linkages.

14. A process for preparing a block polybutadiene homopolymer elastomer having a reduced amount of vinyl linkages comprising:

anionically polymerizing butadiene monomers in a polymerization medium comprising toluene, dimethoxyethane and n-butyl lithium, wherein $LiAl(Et)_3Bu$, in which Li is a lithium atom, Al is an aluminum atom, Et is ethyl and Bu is butyl, is added to the polymerization medium to produce the butadiene elastomer having a reduced amount of vinyl linkages.

15. A method for preparing a block styrene/butadiene copolymer elastomer having a reduced amount of vinyl linkages comprising:

anionically copolymerizing styrene and butadiene monomers in a polymerization medium comprising toluene, tetramethylethylene diamini and n-butyl lithium, wherein $LiAl(Et)_3Bu$, in which Li is a lithium atom, Al is an aluminum atom, Et is ethyl and Bu is butyl, is added to the polymerization medium to produce the styrene/butadiene elastomer having a reduced amount of vinyl linkages.

* * * * *

UNITED STATES PATENT AND TRADEMARK OFFICE
CERTIFICATE OF CORRECTION

PATENT NO.   : 6,506,862 B2
DATED        : January 14, 2003
INVENTOR(S)  : Cabioch et al.

It is certified that error appears in the above-identified patent and that said Letters Patent is hereby corrected as shown below:

<u>Title page,</u>
Item [75], Inventors, "Tuscalossa" should read -- Tuscaloosa --

<u>Column 3,</u>
Line 36, "LiAl(Et)₃Bu," should read -- LiAl(Et)₃Bu, --
Line 65, " of"multidentate" " should read -- of "multidentate" --

<u>Column 8,</u>
Line 23, "diamini" should read -- diamine --

Signed and Sealed this

Tenth Day of June, 2003

JAMES E. ROGAN
*Director of the United States Patent and Trademark Office*